United States Patent
Skeels

(10) Patent No.: US 12,116,868 B2
(45) Date of Patent: Oct. 15, 2024

(54) METHOD AND SYSTEMS FOR SUBSURFACE CARBON CAPTURE

(71) Applicant: FMC Technologies, Inc., Houston, TX (US)

(72) Inventor: Harold Brian Skeels, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 74 days.

(21) Appl. No.: 17/937,655

(22) Filed: Oct. 3, 2022

(65) Prior Publication Data

US 2024/0110464 A1 Apr. 4, 2024

(51) Int. Cl.
*E21B 41/00* (2006.01)
*B01D 53/62* (2006.01)
(Continued)

(52) U.S. Cl.
CPC .......... *E21B 41/0064* (2013.01); *B01D 53/62* (2013.01); *B01D 53/75* (2013.01);
(Continued)

(58) Field of Classification Search
CPC ............... E21B 41/005; E21B 41/0057; E21B 41/0064; E21B 43/34; E21B 43/35; E21B 43/36; E21B 43/38; E21B 43/385; E21B 43/40; E21B 43/164; B01D 53/62; B01D 53/75; B01D 53/80; B01D 331/04;
(Continued)

(56) References Cited

U.S. PATENT DOCUMENTS

| 11,572,747 B1* | 2/2023 | Al-Qasim | E21B 43/26 |
| 2014/0182699 A1* | 7/2014 | Manson | E21B 34/08 |
| | | | 137/15.05 |

(Continued)

FOREIGN PATENT DOCUMENTS

| WO | 2008128331 A1 | 10/2008 |
| WO | 2016094506 A1 | 6/2016 |

(Continued)

OTHER PUBLICATIONS

Oxford English Dictionary, "grind," retrieved Feb. 1, 2024 from https://www.oed.com/dictionary/grind_v1?tab=meaning_and_use #2489935 (Year: 2024).*

(Continued)

*Primary Examiner* — Angela M DiTrani Leff
(74) *Attorney, Agent, or Firm* — Osha Bergman Watanabe & Burton LLP

(57) ABSTRACT

A method includes choosing a well site for Carbon Capture and Sequestration, preparing the well site for Carbon Capture and Sequestration, and hydraulic fracturing a target area in a formation using fracturing fluid containing a reactant proppant to form fractures in the target formation and to trap the reactant proppant in the fractures. The target formation is in communication with a well in the well site. Such methods also include injecting a volume of carbon dioxide into the fractures in the target formation, chemically reacting the volume of carbon dioxide with the reactant proppant, converting the volume of carbon dioxide into a carbonate, and storing the carbonate in the fractures in the target formation.

17 Claims, 15 Drawing Sheets

(51) Int. Cl.
  *B01D 53/75* (2006.01)
  *B01D 53/80* (2006.01)
  *E21B 43/16* (2006.01)
  *E21B 43/295* (2006.01)
  *E21B 43/38* (2006.01)

(52) U.S. Cl.
  CPC ............ *B01D 53/80* (2013.01); *E21B 43/164* (2013.01); *E21B 43/295* (2013.01); *E21B 43/38* (2013.01); *B01D 2221/04* (2013.01); *B01D 2251/402* (2013.01); *B01D 2251/404* (2013.01); *B01D 2251/606* (2013.01); *B01D 2257/504* (2013.01)

(58) Field of Classification Search
  CPC ........ B01D 2251/402; B01D 2251/404; B01D 2251/606; B01D 2257/504
  See application file for complete search history.

(56) References Cited

U.S. PATENT DOCUMENTS

| | | | | |
|---|---|---|---|---|
| 2016/0076349 | A1* | 3/2016 | Dous | C09K 8/665 |
| | | | | 166/308.2 |
| 2016/0230062 | A1* | 8/2016 | Beuterbaugh | E21B 43/164 |
| 2017/0275988 | A1* | 9/2017 | Centurion | E21B 49/00 |
| 2017/0321113 | A1* | 11/2017 | Kropf | C09K 8/805 |
| 2022/0356393 | A1* | 11/2022 | Laycock | C09K 8/80 |
| 2023/0038447 | A1* | 2/2023 | Hasan | C01F 5/24 |
| 2023/0220752 | A1* | 7/2023 | Al-Qasim | E21B 43/16 |
| | | | | 423/210 |
| 2023/0313645 | A1* | 10/2023 | Al-Qasim | E21B 41/0064 |
| | | | | 166/250.01 |
| 2023/0364554 | A1* | 11/2023 | Romaniello | G01N 33/004 |

FOREIGN PATENT DOCUMENTS

| | | |
|---|---|---|
| WO | 2018125663 A1 | 7/2018 |
| WO | 2020198295 A1 | 10/2020 |

OTHER PUBLICATIONS

International Search Report issued in Application No. PCT/US2023/032086, mailed on Dec. 22, 2023 (5 pages).

Written Opinion issued in Application No. PCT/US2023/032086, mailed on Dec. 22, 2023 (6 pages).

* cited by examiner

METHOD AND SYSTEMS FOR SUBSURFACE CARBON CAPTURE

FIELD OF DISCLOSURE

Embodiments disclosed herein relate generally to capturing carbon dioxide ($CO_2$) in a subsurface environment. More particularly, embodiments disclosed herein relate to geologically seeding earthen formations to receive and chemically trap in $CO_2$ for carbon capture and sequestration applications.

BACKGROUND

Carbon Capture and Sequestration (CCS) may be used to permanently remove carbon dioxide ($CO_2$) from the Earth's atmosphere resulting from hydrocarbon fuel usage and various chemical processes in many forms. Some conventional CCS methods may include injecting vast quantities of $CO_2$ into underground geological rock formations including hydrocarbon reservoirs (where the carbon was originally locked up in organic hydrocarbon molecule chains). Hydraulically injecting $CO_2$ into underground reservoirs (containing vast volumes of space in the rock's crevices and indices) is seen as one way of removing $CO_2$ from the Earth's surface environment and storing it away in perpetuity somewhere else. $CO_2$ injection as a process is also used in enhanced oil recovery (EOR) methods for displacing trapped hydrocarbons in various (oil bearing) reservoirs around the world, pushing and displacing the trapped hydrocarbons ahead of $CO_2$ pumped from injection wells, and herding the oil towards production wells (that otherwise would see lower production pressures and/or flowing production rates). Similar injection processes are being used in the art to inject and permanently store $CO_2$ in these same rock indices in depleted underground hydrocarbon reservoirs or aquifers for CCS. However, finding acceptable candidate reservoirs for CCS and trapping $CO_2$ (gas) in perpetuity has proven problematic, given cracks and fissures in geological formations and finite life spans of mechanical hardware (used to inject and cap the injected gas' entry point) may eventually lead to the escape of $CO_2$ back into the Earth's atmosphere.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that include hydraulic fracturing a first target formation in a subterranean formation with fracturing fluid containing a reactant proppant to form fractures in the first target formation and injecting a volume of carbon dioxide into the fractures in the first target formation. The volume of carbon dioxide may chemically react with the reactant proppant and convert the volume of carbon dioxide into a carbonate. Using such methods, the carbonate may be stored in the fractures in the first target formation.

In another aspect, embodiments disclosed herein relate to methods that include choosing a well site for Carbon Capture and Sequestration, preparing the well site for Carbon Capture and Sequestration, and hydraulic fracturing a target formation using fracturing fluid containing a reactant proppant to form fractures in the target formation, wherein the target formation is in communication with a well in the well site, and wherein the reactant proppant comprises a carbonate reactive mineral ore. Such methods may further include injecting a volume of carbon dioxide into the fractures in the target formation, chemically reacting the volume of carbon dioxide with the reactant proppant, converting the volume of carbon dioxide into a carbonate, and storing the carbonate in the fractures in the target formation.

In yet another aspect, embodiments disclosed herein relate to systems that include a wellbore extending a depth from a surface to a target formation, one or more fractures in the target formation formed by a fracturing fluid containing a reactant proppant, wherein the reactant proppant comprises crushed carbonate reactive mineral ore, and a volume of carbon dioxide injected down the wellbore and into the one or more fractures, wherein the volume of carbon dioxide chemically reacts with the reactant proppant to form a carbonate for storage in the target formation.

Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, shapes of the elements as drawn are not necessarily intended to convey any information regarding the actual shape of the elements and have been selected for ease of recognition in the drawing.

DETAILED DESCRIPTION

Figure 1A:
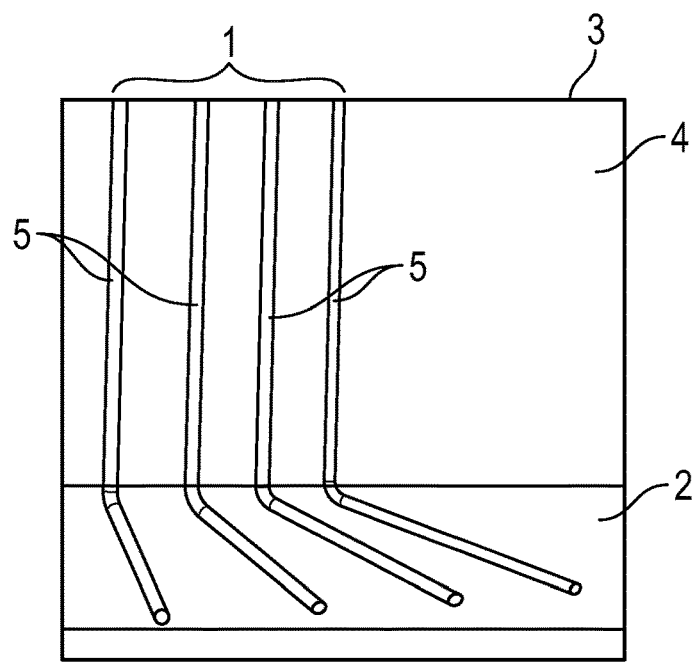
FIGS. 1A-1D are schematic diagram of a completion well system in accordance with embodiments disclosed herein.
Figure 1B:
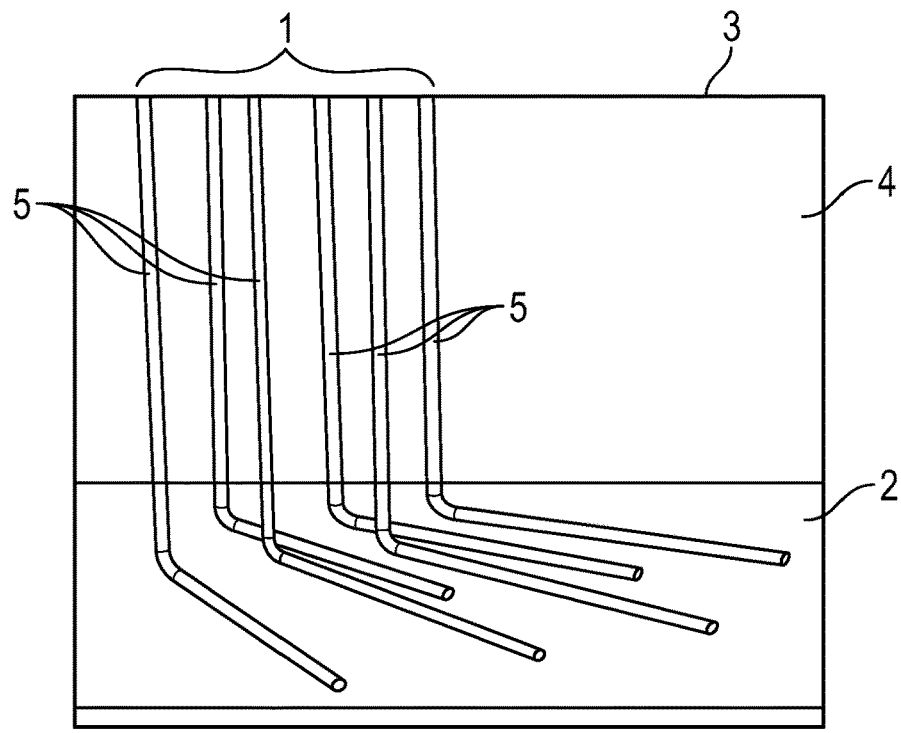
Figure 1C:
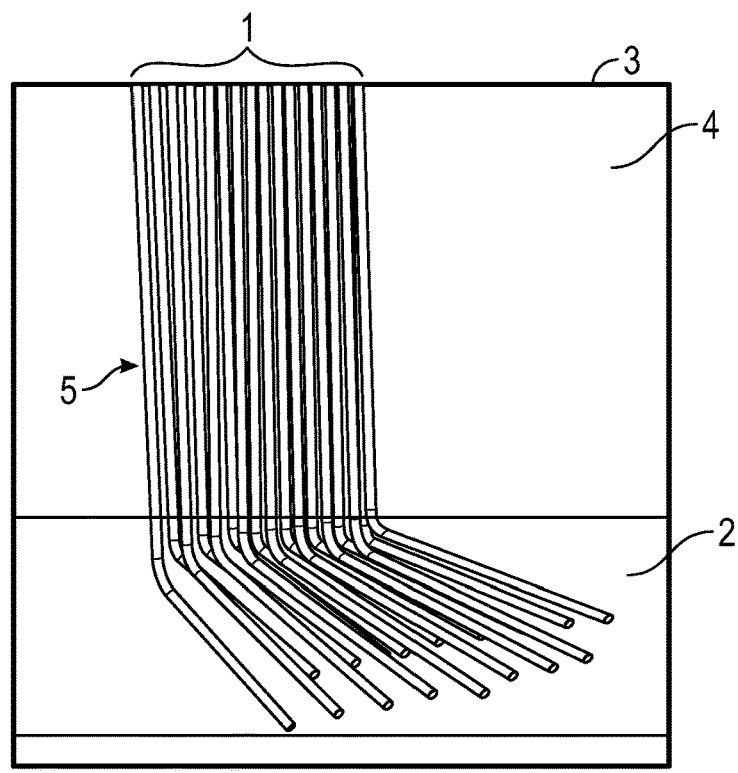
Figure 1D:
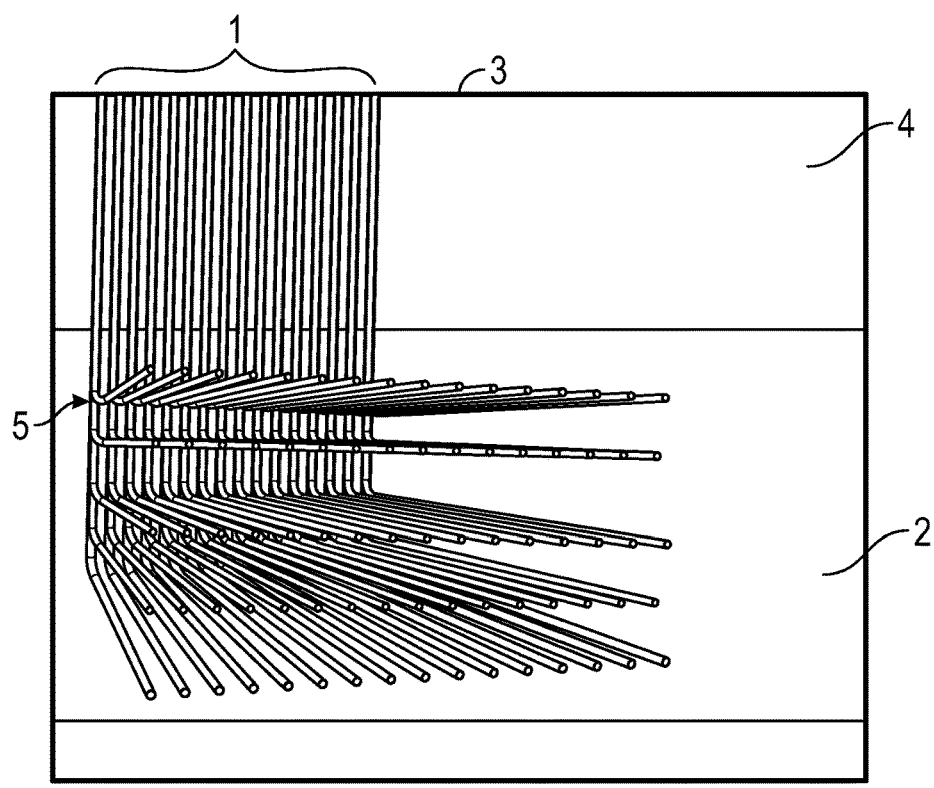

In the following detailed description, certain specific details are set forth to provide a thorough understanding of various disclosed implementations and embodiments. However, one skilled in the relevant art will recognize that implementations and embodiments may be practiced without one or more of these specific details, or with other methods, components, materials, and so forth. For the sake of continuity, and in the interest of conciseness, same or similar reference characters may be used for same or similar objects in multiple figures. As used herein, the term "coupled" or "coupled to" or "connected" or "connected to" "attached" or "attached to" may indicate establishing either a direct or indirect connection, and is not limited to either unless expressly referenced as such. As used herein, fluids may refer to slurries, liquids, gases, and/or mixtures thereof.

Embodiments disclosed herein are directed to a carbon capture system for trapping carbon dioxide ($CO_2$) in a subterranean formation. More specifically, embodiments disclosed herein are directed to fracturing the subterranean formation with a carbonate reactive mineral ore and injecting the CO2 into the fractures to chemically react with carbonate reactive mineral ore forming a trapped carbonate in the subterranean formation. In some embodiments, depending on how wet the target formation is, water may be added to the injected CO2 to help with the carbonate reaction. In such instances, water may be injected in an adjacent well to a well injected with CO2 to mix at the formation/fracture areas to reduce location area and amount of corrosion. In some embodiments, water may be pumped through the annular space between the casing and the tubing (or through a separate line) to enter the wellbore at the base of the tubing to mix with the CO2 as it enters the fractures. Additionally, the carbonate reactive mineral ore is crushed Manganese (Mn), Magnesium (Mg), or Calcium (Ca) laden basalt thereby forming Manganese Carbonate MnCO3, Magnesium Carbonate (MgCO3), or Calcium Carbonate (CaCO3) when chemically reacting with the injected CO2 and water. It is further envisioned that the injected water may be refuse water, wastewater, fracturing water, mineral water, or other types of water.

Embodiments described herein may provide a carbon capture system that includes a subterranean formation fractured with carbonate reactive mineral ores. By fracturing a formation with carbonate reactive mineral ores, the formation may be "seeded" with carbonate reactive mineral ores (reactants) for carbon mineralization. In such manner, the amount of carbon capture and mineralization in existing wells used for methods according to embodiments of the present disclosure may be significantly increased, e.g., by allowing the use of otherwise unreactive formations to capture injected CO2 gas into a stable solid form, in contrast to trying to capture CO2 in gas form that could escape much later.

Chemically reacting injected CO2 within formation fractures plays a valuable and useful role in Carbon Capture and Sequestration (CCS). By using carbon capture systems according to embodiments of the present disclosure for carbon capture operations, the carbon capture system may provide long term storage of CO2 within subterranean formations and eliminate environmental risks associated with CO2 storage (in perpetuity). Further, CCS systems and methods according to one or more embodiments described herein may provide a cost-effective alternative to conventional carbon capture systems, storage, and monitoring. For example, one or more embodiments described herein may eliminate trapped CO2 leaking out the of subterranean formations and back to the surface environment due to fissure migration or long-term degradation (deterioration from carbonic acid formation) of capping hardware or the rock itself. The embodiments are described merely as examples of useful applications, which are not limited to any specific details of the embodiments herein.

In accordance with one or more embodiments, a carbon capture system includes corrosion resistant (e.g., stainless-steel) equipment in a wellbore to transport carbonate reactive mineral ore and CO2 into subterranean formations for CO2 storage. Although corrosion resistance may not necessarily be needed for transport of the mineral ore slurry, corrosion resistance may significantly improve the life of the equipment when subsequently pumping large volumes of CO2 down the well. Additionally, corrosion resistant equipment is usually somewhat metallurgically harder than non-corrosion resistant equipment, making corrosion resistant equipment more abrasion resistant, and thus also helpful for transporting the mineral ore slurry.

In one or more embodiments, the corrosion resistant equipment may include a tubing string, packers, polished bore receptacles (e.g., a bore receptacle connected to a packer or setting sleeve), hydraulic fracturing device (e.g., perforation gun), and other devices used in hydraulic fracturing and injections operations used in the oil and gas industry. Further, the carbon capture system includes surface equipment in fluid communication with the subterranean formations via the wellbore. The surface equipment may include a wellhead (e.g., Christmas tree), pumps, tanks, pressure lines, and other devices used in hydraulic fracturing and injections operations used in the oil and gas industry.

In one or more embodiments, the carbon capture system disclosed herein uses a variation of the known perforation, fracking methodology to 1) introduce a substitute proppant material that is chemically reactive with CO2 to change injected CO2 chemical phase from a gas to a mineral solid (carbonate reactive mineral ore), and 2) instead of flowing hydrocarbons to the surface after the aforementioned well completion work is done, pumping and injecting CO2 into a tubing string, through perforations into the fractured (fissured crack) target rock where the trapped proppant can chemically react over time with the injected CO2. Once the proppant is chemically spent, the trapped carbonate mineral in the rock crevices may be sealed off and the perforation/fracking well completion sequence may be repeated to open new cracks and introduce new proppant material to trap additional CO2 into another region, to maximize the amount of trapped CO2 carbonate throughout the target reservoir in perpetuity.

Conventional Carbon Capture and Sequestration (CCS) methods use depleted sandstone or carbonate hydrocarbon bearing reservoirs, deep saline aquifers, or basalt basins for CO2 injection. However, in conventional methods, depleted sandstone reservoirs will only trap CO2 (not convert it). Basalt and carbonate reservoirs may convert some CO2, but how much will depend on how much reactive metal (e.g., Ca—limestone) making up the rock formation and the exposed surface area (rock porosity). Additionally, carbonate rock hydrocarbon reservoirs are far less in number than sandstone hydrocarbon reservoirs. Many depleted reservoirs may not be suitable for extra-long term sequestration sites, and thus the amount of existing sites that may be selected for conventional CCS methods is limited. Further, in conventional CCS methods, injected CO2 stays gaseous and may eventually find its way past faults (or fissures) in caprock barriers. For example, it may be 20-50 years before trapped CO2 gas would find its way out and back to the surface environment due to fissure migration or long-term degradation (deterioration from carbonic acid formation) of capping hardware or the rock itself.

Advantageously, the carbon capture system disclosed herein may store CO2 in subterranean formations without the risk of CO2 leaking to a surface environment or other types of reservoirs. Moreover, because the operation of the carbon capture system converts CO2 into a carbonate and stores the converted carbonate in the subterranean formations, the disclosed carbon capture methods may provide long term storage for CCS. Overall, carbon capture systems in accordance with embodiments of the present disclosure may minimize product engineering, reduce risk associated with surface equipment, reduce assembly time, and reduce hardware cost. Thus, the disclosed carbon capture methods using injected carbonate reactive mineral ore to convert injected CO2 to a carbonate within subterranean formations improves safety on site and reduces cost associated with conventional carbon capture operations.

FIGS. 1A-1D show various well completion systems for producing hydrocarbons according to one illustrative implementation. For example, a plurality of wellbores 1 may be adjacent to each other in various configurations such as sparse (FIG. 1A), staggered and sparse (FIG. 1B), staggered and tight (FIG. 1C), or stacked and tight (FIG. 1B) to optimize the amount of physical contact area between the drilled wellbore(s) 1 and a target reservoir 2. The plurality of wellbores 1, each of which is connected to a surface 3, may be drilled through one or more subterranean formations 4 to reach to the target reservoir 2. For illustration purposes, only one subterranean formation 4 is shown below the surface 3; however, there may be many layers of subterranean formations below the surface 3. The one or more subterranean formations 4 may be overburden, cap rock, and sandstone (hydrocarbon bearing) formations. In one example, the one or more subterranean formations 4 includes the target reservoir 2 containing hydrocarbons to be produced.

In one or more embodiments, the plurality of wellbores 1 may be vertical (perpendicular to the relative target reservoir rock) or horizontal (parallel along the relative target reservoir rock) or a combination thereof. In most cases, casing may be installed in the plurality of wellbores 1. In some embodiments, the casing may extend through the well into the target reservoir 2 (for wellbore hole stability, especially in horizontal wells) and subsequently be perforated using a perforating device to puncture the casing and create (perforation) access into the target reservoir 2 to allow fluid flow to enter or exit the plurality of wellbores 1. To extend the perforations, hydraulic fracturing operations may be conducted by pumping a fluid slurry (containing and suspending a fine granular solid material—proppant) down the casing or a tubular string to exit into perforations. By adding pressure to the fluid slurry, the target rock cracks (exceeding the rock's fracture gradient) allowing the fluid slurry to continue to flow further into the newly formed cracks and exposing more target rock crevice volume, depositing the suspended proppant along the way. Subsequently, reducing pressure below the target rock's (reservoir's) geological fracture gradient and pore pressure allows the fluid to flow back in the opposite direction, and allows the hydraulically opened cracks to close, trapping the deposited proppant particles in place (the proppant preventing full reclosure of the fissured crack).

In some embodiments, a tubular string 5 may be used to transport fluids into the plurality of wellbores 1. The tubular string 5 may include a plurality of tubulars connected end-to-end (i.e., a drill string or production string). Additionally, the tubular string 5 extends into the plurality of wellbores 1 from a wellhead at the surface 3. The tubular string 5 extends to the target reservoir 2, thereby forming a flow conduit from the target reservoir 2 to surface 3. The tubular string 5 may include multiple mechanically sleeved opening locations suspended in the plurality of wellbores 1 from a bottom of the tubular string 5 all along the path of the tubing near the casing perforations within the target reservoir 2. Each target reservoir perforation location may be isolated by one or more packers or plugs sealing an annulus between the tubular string 5 and the casing from a bottom of the plurality of wellbores 1. Once the target reservoir 2 has been properly connected with the wellbore 1 and tubular string 5, fluid pressure inside the plurality of wellbores 1 may be lowered below the reservoir's pore pressure, allowing hydrocarbons to flow into the plurality of wellbores 1 and up to the surface 3. Single or multiple perforated zones may be individually or collectively opened for a desired hydrocarbon flow rate.

Figure 2:
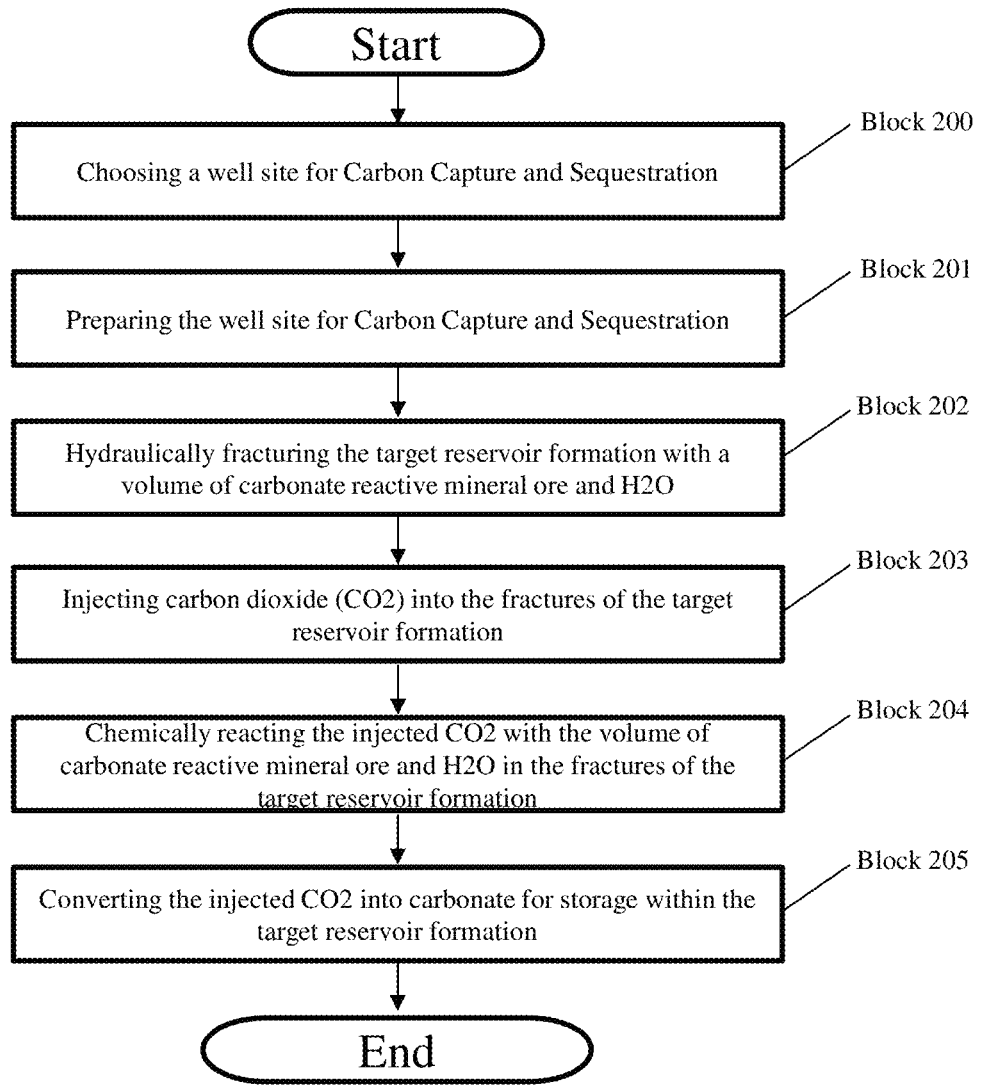
FIG. 2 is a flow chart of a method in accordance with embodiments disclosed herein.

FIG. 2 is a flowchart showing a method of a carbon capture operation preformed at a well site (such as the well sites described in FIGS. 1A-D) according to embodiments of the present disclosure. One or more blocks in FIG. 2 may be performed by one or more components (e.g., a computing system coupled to a controller in communication with the devices at the well site). For example, a non-transitory computer readable medium may store instructions on a memory coupled to a processor such that the instructions include functionality for conducting one or more steps in the carbon capture operation. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, a well site is chosen for Carbon Capture and Sequestration (CCS) operations. The well site may be chosen based on a variety of factors. For example, the well site may have a well with a target reservoir formation such as a porous formation, which could structurally support one or more wellbore drilled (vertically and/or horizontally) into the target reservoir formation, without collapsing. Additionally, the well site may be on land or offshore and may be in various stages of a well, such as rig site preparation, drilling, completion, abandonment etc., and in other environments, such as work-over rigs, fracking installation, well-testing installation, oil and gas production installation, without departing from the scope of the present disclosure. In some embodiments, engineers (i.e., reservoir engineer) and geologists may provide input and data to aid in the well site selection process. Advantageously, by using carbon capture methods according to embodiments of the present disclosure, a particular type of formation rock does not need to be naturally occurring for selection of a well site. Thus, according to embodiments of the present disclosure, a well site may be chosen with a well extending through various types of formation rocks, including, but not limited to, basalt rock, carbonate, or sandstone.

In Block 201, with the well site chosen, the well site is prepared to conduct the CCS operations. Based on the stage of the well, operations are conducted to have the well site include functionality for CCS. For example, if the well has been abandoned, the equipment within the well may be removed (i.e., the well is stripped) and replaced with corrosion resistant (e.g., stainless-steel) equipment. In such embodiments, existing casing within the abandoned well may be left (not removed) within the well. In some embodiments, a stainless-steel tubular string may be lowered into the wellbore to hang from a wellhead. Additionally, the stainless-steel tubular string may include corrosion resistant downhole tools used for hydraulic fracturing and injection operations. Further, the wellhead may be configured with valves and inlets to be an injection tree.

Alternatively, if the equipment within the abandoned well is already rated to be corrosion resistant (such as, enhanced oil recovery equipment), the equipment may be retrofitted to allow for hydraulic fracturing and injection operations. For example, the casing or tubing within the abandoned well may be any material type that is a corrosion limiting material (e.g., a metallic composition having 13% Cr or more to minimize metal weight loss corrosion from the presence of $CO_2$ and water (carbonic acid)). In the case where the well site chosen is still in operation, the well may be shut off, stopping production or drillings operations, i.e., the well is killed. For example, operations being conducted in the wellbore may be stopped and the wellhead may be used to control downhole pressure and fluids. Next, the downhole equipment may be removed (i.e., the well is stripped) and replaced with corrosion resistant (e.g., stainless-steel) equipment, or the downhole equipment is retrofitted, to allow for hydraulic fracturing and injection operations.

In some embodiments, preparing a well site for CCS may include setting an isolation packer and a polished bore receptacle, which may be used to physically isolate a perforated zone in the well from the rest of the well. A polished bore receptacle is a pipe having tight manufacturing tolerances for enhanced sealing, where the lower end of the bore receptacle may be connected with a packer or setting sleeve to form a polished bore receptacle and seal assembly. A polished bore receptable and seal assembly may be used as an expansion joint to accommodate string movement during well treatment and as a separation tool to allow removal of tubing string while leaving the polished bore receptacle and seal assembly set in a packer.

In some embodiments, preparing a well site for CCS may include fluidly coupling a wellhead to the well at the surface after casing and/or other formation isolation equipment has been installed downhole. A tubular string may be extended into the well to reach a target area of the formation (e.g., which may be used to inject fluids to the target area). In some embodiments, the tubular string may be connected to an installed isolation packer and bore receptacle to fluidly couple the target area to the wellhead at the surface.

After all the downhole equipment is installed, hydraulic fracturing equipment is provided on the surface of the well at well site. For example, the hydraulic fracturing equipment may include one or more tanks (e.g., material source tanks), one or more shakers, various connecting manifold equipment, and/or one or more pumps fluidly coupled to the wellhead via pressure lines.

In Block 202, with the well site prepared, the target reservoir formation is hydraulically fractured with a volume of carbonate reactive mineral ore proppant (also referred to herein as "reactant proppant") and water ($H_2O$). For example, in some embodiments, a cased wellbore may be sequentially perforated (e.g., using a perforating gun sent down the well to the target zone in the formation) to establish staged hydraulic communication between the well and the formation rock along the drilled well path. The perforated well path may then be selectively isolated for hydraulically fracturing the rock formation at each perforation to break the rock and increase exposed surface area further. During hydraulic fracturing, to keep the cracks in the rock open, a slurry of liquid (e.g., water and chemicals) and solids (the reactant proppant), referred to a fracturing fluid, may be pumped into the well and into the newly formed hydraulic fissures and cracks to keep the cracks open once hydraulic fracture pressure is relieved.

Fracturing fluid may be mixed at the surface, for example, by mixing the reactant proppant and water, which may then be pumped through the wellhead and down into the wellbore via the tubular string. The reactant proppant may be provided as a volume of crushed carbonate reactive mineral ore, where the carbonate reactive mineral ore may be crushed to a size of conventionally used sand or ceramic proppant. For example, the reactant proppant may have proppant sizes between 8 and 140 mesh (106 μm-2.36 mm), such as 16-30 mesh (600 μm-1180 μm), 20-40 mesh (420 μm-840 μm), 30-50 mesh (300 μm-600 μm), 40-70 mesh (212 μm-420 μm) or 70-140 mesh (106 μm-212 μm). Generally, smaller sized reactant proppant may be capable of penetrating farther into fissures, and thus, providing more reactive surface area available for $CO_2$ chemical conversion. Additionally, a shape of the reactant proppant may also influence a final permeability through the fracture. For example, the shape of the reactant proppant may be spherical to create greater permeability and conductivity. The roundness of the spherical reactant proppant may be analyzed using a visual, manual method based on known methods.

In some embodiments, the reactant proppant may be selected from at least one or crushed Manganese (Mn), Magnesium (Mg), or Calcium (Ca) laden basalt. In some embodiments, the overall reactant proppant mixture composition may be designed based on a percentage amount of reactive chemical (i.e., Ca, Mg, Mn) to inert rock/chaff/slag in the overall basalt makeup. In some embodiments, the overall reactant proppant mixture composition may be designed based on a ratio of an amount of reactive chemical in the reactant proppant mixture composition to the amount of $CO_2$ to react to it (chemical formula mass balance in the reaction equation). In designing the reactant proppant mixture composition, the higher percentage reactive material injected in the reactant proppant mixture composition proportionally allows a higher amount of $CO_2$ captured. According to embodiments of the present disclosure, a reactant proppant may be formulated to have a higher percent by weight or by volume of Manganese (Mn), Magnesium (Mg), and/or Calcium (Ca) laden basalt than the amount of reactant material that may by chance contain some small amount of calcium or basalt. For example, the total amount of proppant material used in a fracturing fluid according to embodiments of the present disclosure may have at least 90 percent by weight of Mn, Mg, and/or Ca.

Next, the fracturing fluid mixture may be pumped down a conduit of a tubular string hanging with the wellbore or a conduit of a casing lining the wellbore. The mixture may be pumped at various pressures, flowrates, and volumes based on the number of fractures needed. From the tubular string, the mixture exits through a fracturing device, such as a pump or perforation gun, coupled to the tubular string at a depth approximate to the target reservoir formation. Additionally, packers above and below the target reservoir formation may be actuated to seal an annulus between the target reservoir formation and the tubular string. The pump or fracturing device jet the mixture outwardly to fracture the target reservoir formation and inject reactant proppant into the formation. The pressure from the hydraulic fracturing injects and traps the reactant proppant into the fractures. In other words, when hydraulic fracturing with reactant proppant, pressure from a single hydraulic fracturing step may both create fractures in a target area of a formation and inject the reactant proppant within the formed fractures. The injected reactant proppant may help prop the fractures open as pressure from hydraulic fracturing is relieved, and in such step, the reactant proppant may be trapped in the formed fractures. In such manner, hydraulic fracturing with reactant proppant may be performed similar to conventional hydraulic fracturing methods, but instead of using conventional proppant, a reactant proppant is used to seed the formation with a carbonate reactant material.

In some embodiments, if the formation has already been fractured, the fracturing fluid mixture may be pumped into the existing fractures with or without using a higher pressure necessary for fracturing. Once the mixture is injected into the formation, the formation may be referred to as "seeded" with the fracturing fluid mixture.

In Block 203, with the target reservoir formation fractured and seeded with reactant proppant, carbon dioxide ($CO_2$) is injected into the target reservoir formation. For example, at the surface, a pipeline from a $CO_2$ source is connected to the wellhead such that the $CO_2$ may be injected through the wellhead and down the tubular string. From the tubular string, the injected $CO_2$ exits through the pump or fracturing device to enter the fractures within the target reservoir formation. Additionally, the $CO_2$ may be injected in a dense state. For example, a compressor between the $CO_2$ source and the wellhead may be used to compress the $CO_2$ into a dense state for injection into the wellhead. In some embodiments, the $CO_2$ source may be provided in a dense state.

In Block 204, the injected $CO_2$ chemically reacts with the volume of carbonate reactive mineral ore and water injected within the fractures of the target reservoir formation. For example, within the fractures, the injected $CO_2$ contacts and reacts with the volume of carbonate reactive mineral ore and water.

In Block 205, as the chemical reaction occurs, the injected $CO_2$ is converted into a non-gaseous carbonate for storage within the target reservoir formation. Based on the type of the carbonate reactive mineral ore, the converted carbonate may be Manganese Carbonate ($MnCO_3$), Magnesium Carbonate ($MgCO_3$), or Calcium Carbonate ($CaCO_3$). In some embodiments, approximate two tons of carbonate reactive mineral ore can convert one ton of $CO_2$.

In one or more embodiments, with the converted carbonate stored within the target reservoir formation, the method of a carbon capture operation described in the flowchart of FIG. 2 provides a nucleation site for subsequent $CO_2$ sequestration activities. Additionally, by converting the injected $CO_2$ into a carbonate, the method of a carbon capture operation described in the flowchart of FIG. 2 further provides long term storage of the $CO_2$ along while eliminating the risk of $CO_2$ leaking from cracks and fissures in the subterranean formations.

Still referring to FIG. 2, Blocks 202-205 may be repeated for additional target reservoirs in communication with the well. For example, a single well may have multiple zones recompleted, where after a first zone is recompleted (fractured, seeded with carbonate reactive mineral ore, and injected with $CO_2$ for $CO_2$ mineralization), one or more subsequent zones may be recompleted. In some embodiments, a well may have up to 50 zones recompleted. Further, Blocks 201-205 may be repeated for additional wells at the well site such as adjected wells described in FIG. 1B.

Figure 3:
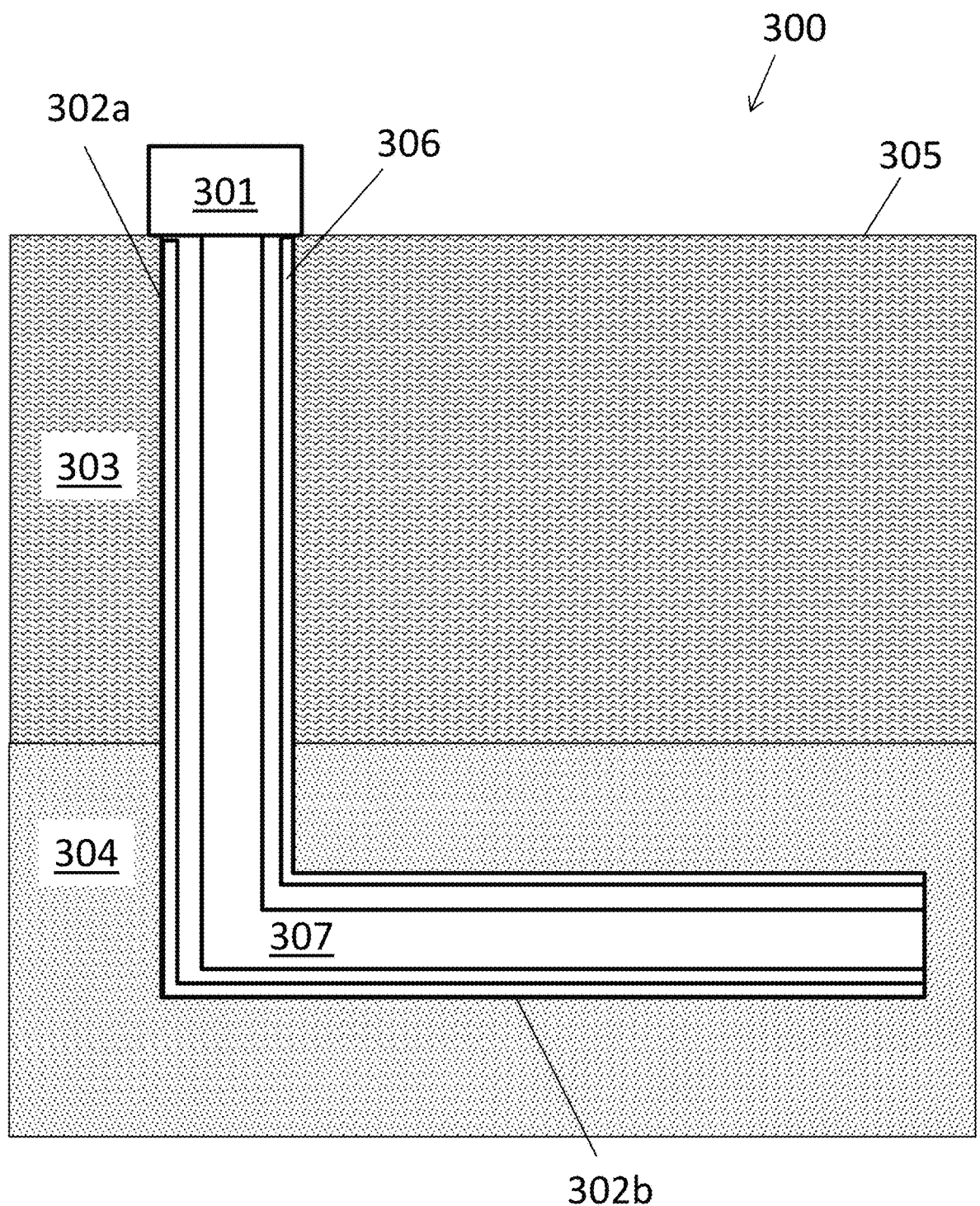
FIGS. 3-14 show examples of a carbon capturing operation at a well site implementing the method of FIG. 2 in accordance with one or more embodiments of the present disclosure.

Now referring FIGS. 3-14, in one or more embodiments, FIGS. 3-14 illustrates a system of implementing the method described in the flowchart of FIG. 2 at a well site. Referring to FIG. 3, an example well site 300 in accordance with embodiments disclosed herein is illustrated. However, various other types and configurations of wells may be used with carbon capture methods according to embodiments of the present disclosure. The well site 300 chosen for Carbon Capture and Sequestration (CCS) may be a well site that has been abandoned. In the abandoned well site 300, a plug 301 plugs a wellbore 302a, 302b drilled through a first formation 303 and into a second formation 304 below a surface 305. Additionally, the wellbore 302 may include a vertical section 302a extending longitudinally in the first formation 303 and the second formation 304, and a horizontal section 302a extending laterally in the second formation 304. In some embodiments, the section 302a may be vertically oriented in the second formation 304 instead of horizontal without departing form the scope of the present disclosure. In general, there may be many layers of subterranean formations below the surface. Further, the first formation 303 may be positioned above the second formation 304. In addition, the second formation 304 may be a target reservoir formation such as a porous formation, basalt rock, carbonate, or sandstone formation.

In one or more embodiments, a casing 306 or liner may be installed in the wellbore. It is further envisioned that a tubing string 307 may have been left within the wellbore 302a, 302b.

Figure 4:
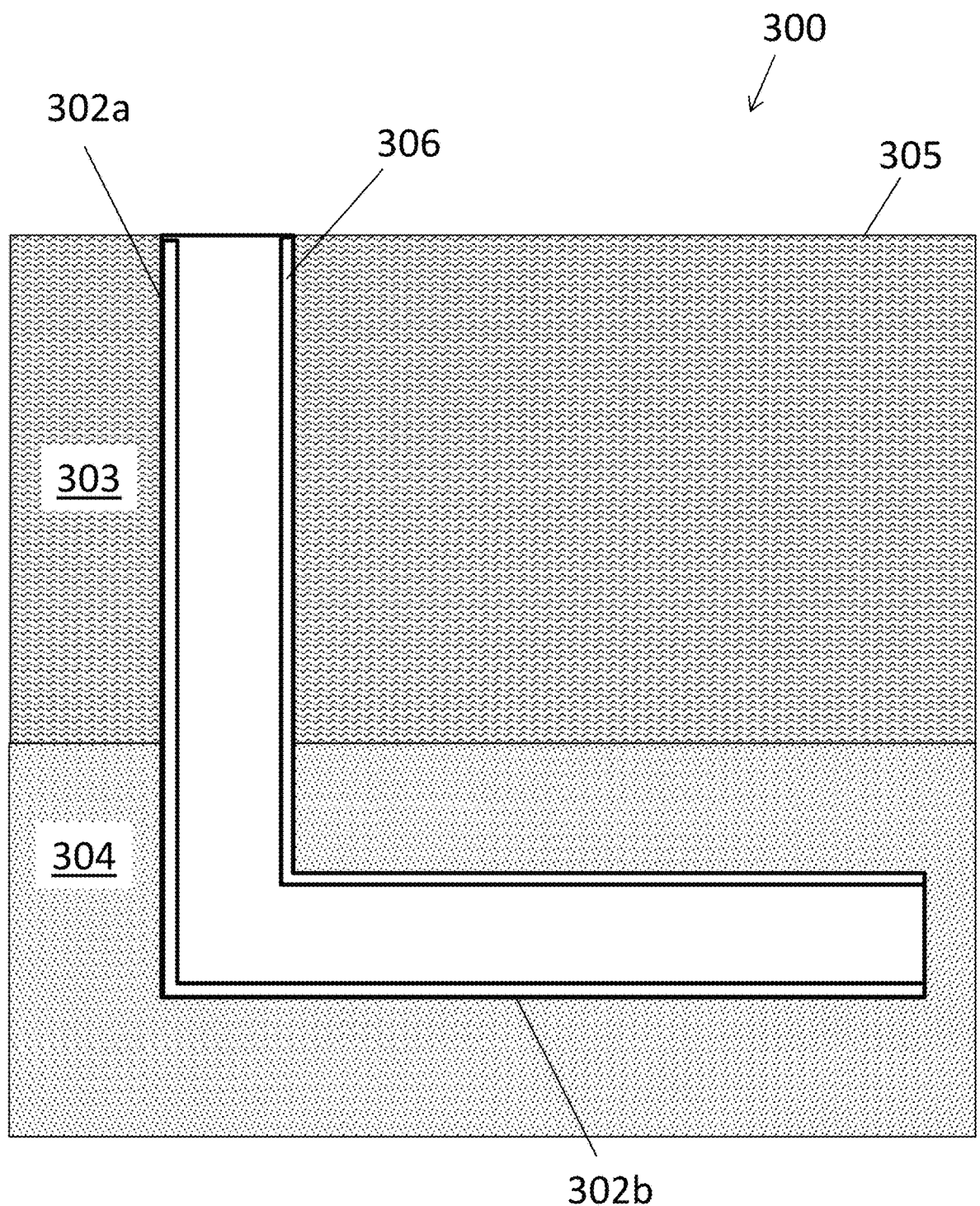

Now referring to FIG. 4, in one or more embodiments, the plug 301 is removed and the tubing string 307 is pulled out of the wellbore 302a, 302b. Additionally, as the casing 306 may be cemented to the wellbore 302a, 302b, the casing 306 stays in place.

Figure 5:
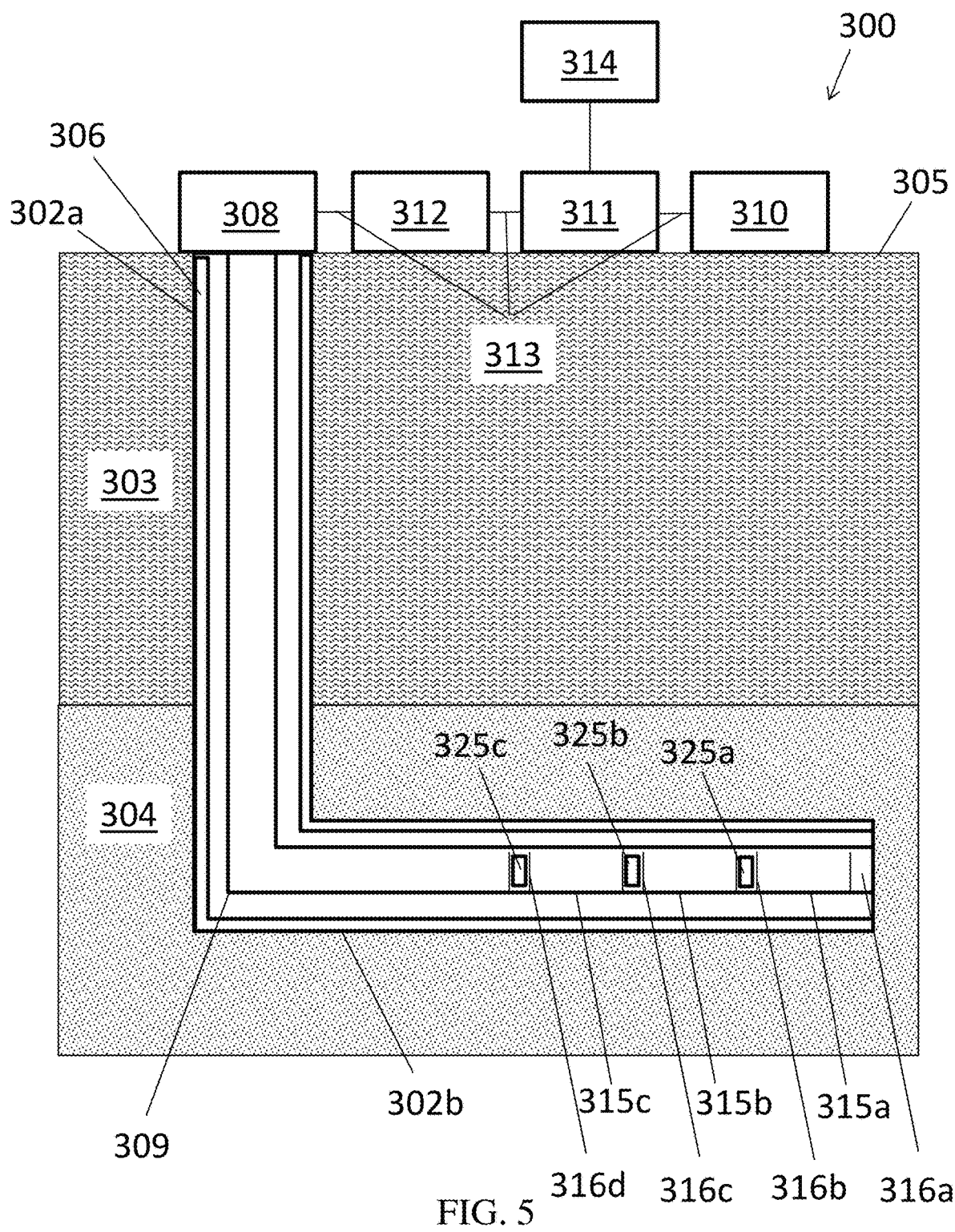

As shown in FIG. 5, with the wellbore 302a, 302b stripped, a wellhead 308 is installed on the wellbore 302a, 302b at the surface 305 to be in fluid communication with the second formation 304. The wellhead 308 may be an injection tree to inject fluids into the wellbore 302a, 302b. Additionally, an injection tubing string 309 may be installed within the wellbore 302a, 302b to hang from the wellhead 308. It is further envisioned that both the wellhead 308 and the injection tubing string 309 may be made from or having fluid flow components made from stainless-steel or corrosion resistant metal.

The injection tubing string 309 extends past the first formation 303 and into or past the second formation 304, thereby forming a flow conduit between the first formation 303 and the second formation 304. In some embodiments, the injection tubing string 309 may include a series of fracturing devices 315a-315c and packers 316a-316d along the horizontal section 302a. The packers 316a-316d may be actuated to seal an annulus between the casing 306 and the injection tubing string 309 to isolate various lengths of target formations within the second formation 304. The fracturing devices 315a-315c may be used to fracture the various isolated lengths of target formations within the second formation 304. Additionally, the injection tubing string 309 may be provided with bore receptacles 325a-325c to receive plugs (321a-321c) to seal off flow therein. For example, the bore receptacles 325a-325c may be adjacent or within the in the packers 316a-316d.

In one or more embodiments, with the wellhead 308 and the injection tubing string 309 installed, hydraulic fracturing equipment is provided on the surface 305. For example, the hydraulic fracturing equipment may include one or more tanks 310, one or more shakers 311, and one or more pumps 312 fluidly coupled to the wellhead 308 via pressure lines 313. The one or more tanks 310 may be any storage device to hold an aqueous base fluid, e.g., water ($H_2O$), such as a metal tank, pool, water well, or any type of reservoir containing water. The one or more shakers 311 may be any device to mix the aqueous base fluid from the one or more tanks 310 with carbonate reactive mineral ore (e.g., reactant proppant formed from one or more of crushed Manganese (Mn), Magnesium (Mg), or Calcium (Ca) laden basalt) from a carbonate reactive mineral ore source 314 in fluid communication with the one or more shakers 311. The carbonate reactive mineral ore source 314 may be any type of reservoir or storage device to hold the carbonate reactive mineral ore. The one or more pumps 312 may be any type of pump (e.g., a hydraulic fracturing pump) to pump a mixture of aqueous base fluid (e.g., water) and carbonate reactive mineral ore to the wellhead 308 for injection.

Figure 6:
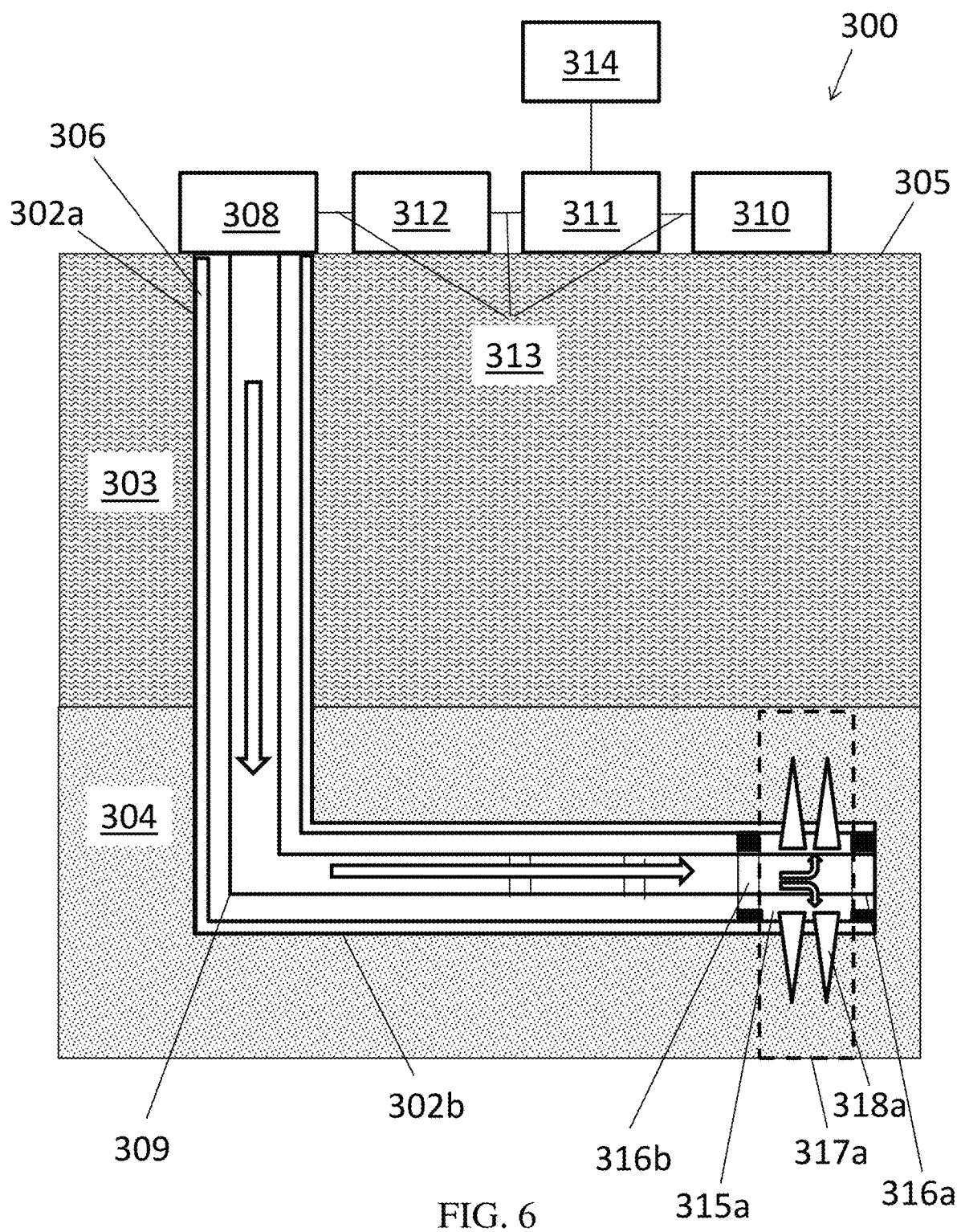

Now referring to FIG. 6, a first packer 316a below (relatively farther from the wellhead 308) a first fracturing device 315a and a second packer 316b above (relatively closer to the wellhead 308) the first fracturing device 315a are actuated seal to an annulus between the casing 306 and the injection tubing string 309 to isolate a first target area 317a in the second formation 304. Next, the mixture of aqueous base fluid and carbonate reactive mineral ore is pumped down (see unfilled block arrows) the wellbore 302a, 302b and into the first fracturing device 315a. From the first fracturing device 315a, the mixture is injected to perforate the casing 306, fracture the first target area 317a, and form fractures 318a within the first target area 317a. The high pressure from the hydraulic fracturing will fill the fractures 318a with a volume of the carbonate reactive mineral ore mixture.

Figure 7:
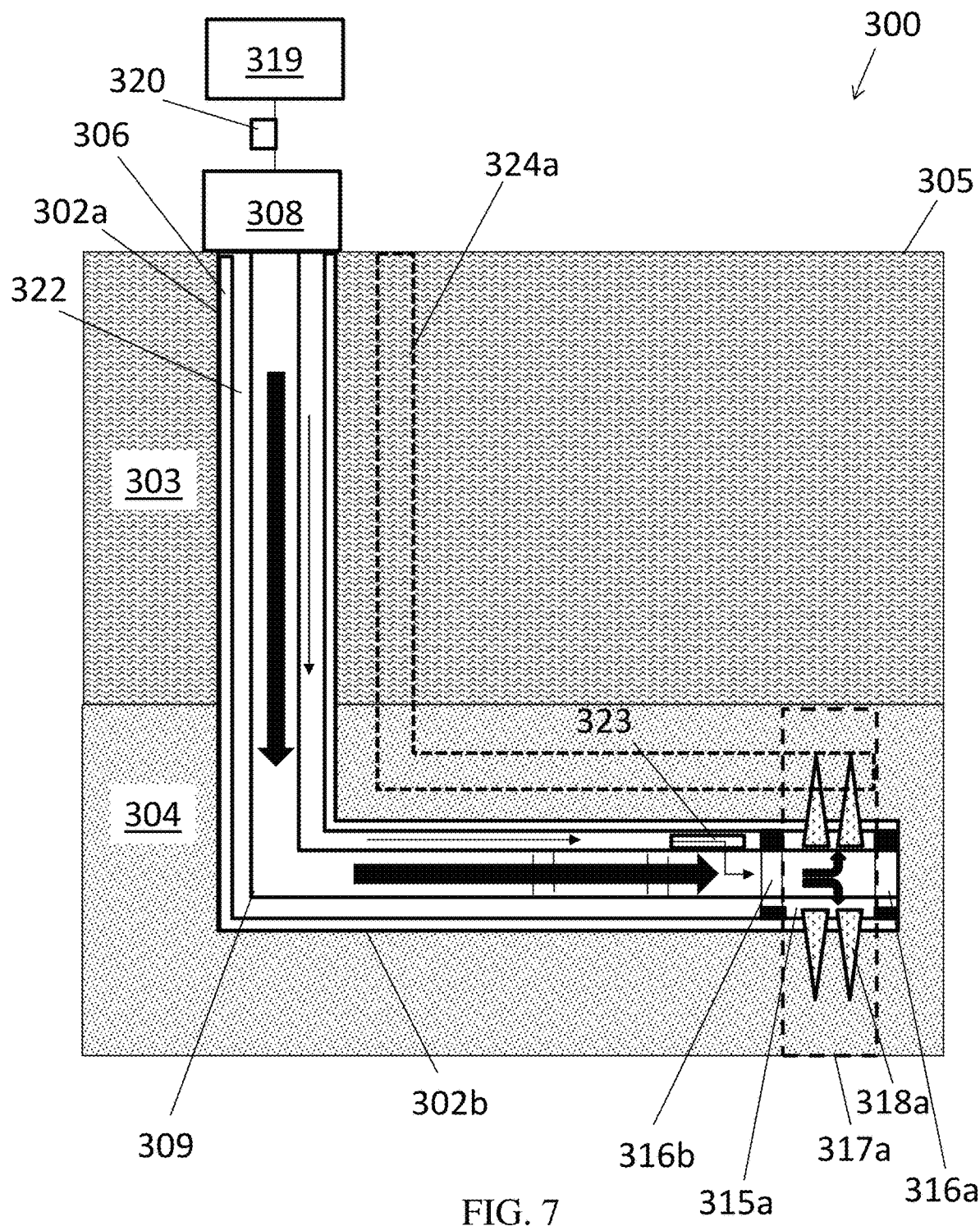

In one or more embodiments, with the fractures 318a filled with the volume of the carbonate reactive mineral ore mixture, a CO2 source 319 is fluidly coupled to the wellhead 308, as shown in FIG. 7. For example, a pipeline from the CO2 source 319 fluidly is coupled to the wellhead 308. In some embodiments, the hydraulic fracturing equipment may be removed from the well site 300 before the CO2 source 319 is fluidly coupled to the wellhead 308. Additionally, a compressor 320 between the CO2 source 319 and the wellhead 308 compresses the CO2 into a dense state for transport to the well. With the CO2 source 319 fluidly coupled to the wellhead 308, CO2 is injected down (see filled block arrows) the injection tubing string 309 in a CO2 injection step. The injected CO2 will exit the injection tubing string 309 through the first fracturing device 315a and enter the fractures 318a. In the fractures 318a, the injected CO2 will chemically react with the volume of the carbonate reactive mineral ore mixture filled in the fractures 318a. As the chemical reaction occurs, the injected CO2 is converted into a carbonate (e.g., Manganese Carbonate $MnCO_3$, Magnesium Carbonate ($MgCO_3$), or Calcium Carbonate ($CaCO_3$)), where the formed carbonate remains in place for storage within the first target area 317a.

In some embodiments, a predetermined amount of CO2 may be injected into the isolated zone in order to substantially or fully react the injected carbonate reactive mineral ore. For example, in some embodiments, the amount of injected CO2 may be determined using chemical calculations to determine when the zone is fully reacted, e.g., calculating the amount of injected CO2 based on the amount of injected carbonate reactive mineral ore, where the ratio for reacting CO2 with reactive mineral ore is approximately 1:1. In some embodiments, the amount of injected CO2 may be determined based on CO2 flowrate vs pressure during injection to determine when a zone has been substantially or fully reacted.

Still referring to FIG. 7, in one or more embodiments, water may be needed to mix in to supplement the carbonate reaction of the injected CO2 and carbonate reactive mineral ore. When water is needed, water may be simultaneously injected into the wellbore 302a, 302b with the CO2. For example, water may be injected in an annulus 322 between the casing 306 and the injection tubing string 309. From the annulus 322, the water may enter the injection tubing string 309 via a side pocket mandrel 323. The side pocket mandrel 323 allows the water to be pumped though the annual 322 (or through a separate line) to enter the wellbore 302a, 302b at a bottom of the injection tubing string 309 to mix with the injected CO2 as the injected CO2 enters the fractures 318a. by mixing the water at the bottom, carbonic acid corrosion is minimized to just the components at the bottom instead of the entire wellhead 308 and the injection tubing string 309. However, in some embodiments, water may be injected in one or more adjacent wells 324a in communication with or having a region near the first target area 317a. It is further envisioned that the injected water may be refuse water, wastewater, fracturing water, mineral water, or other types of water.

Figure 8:
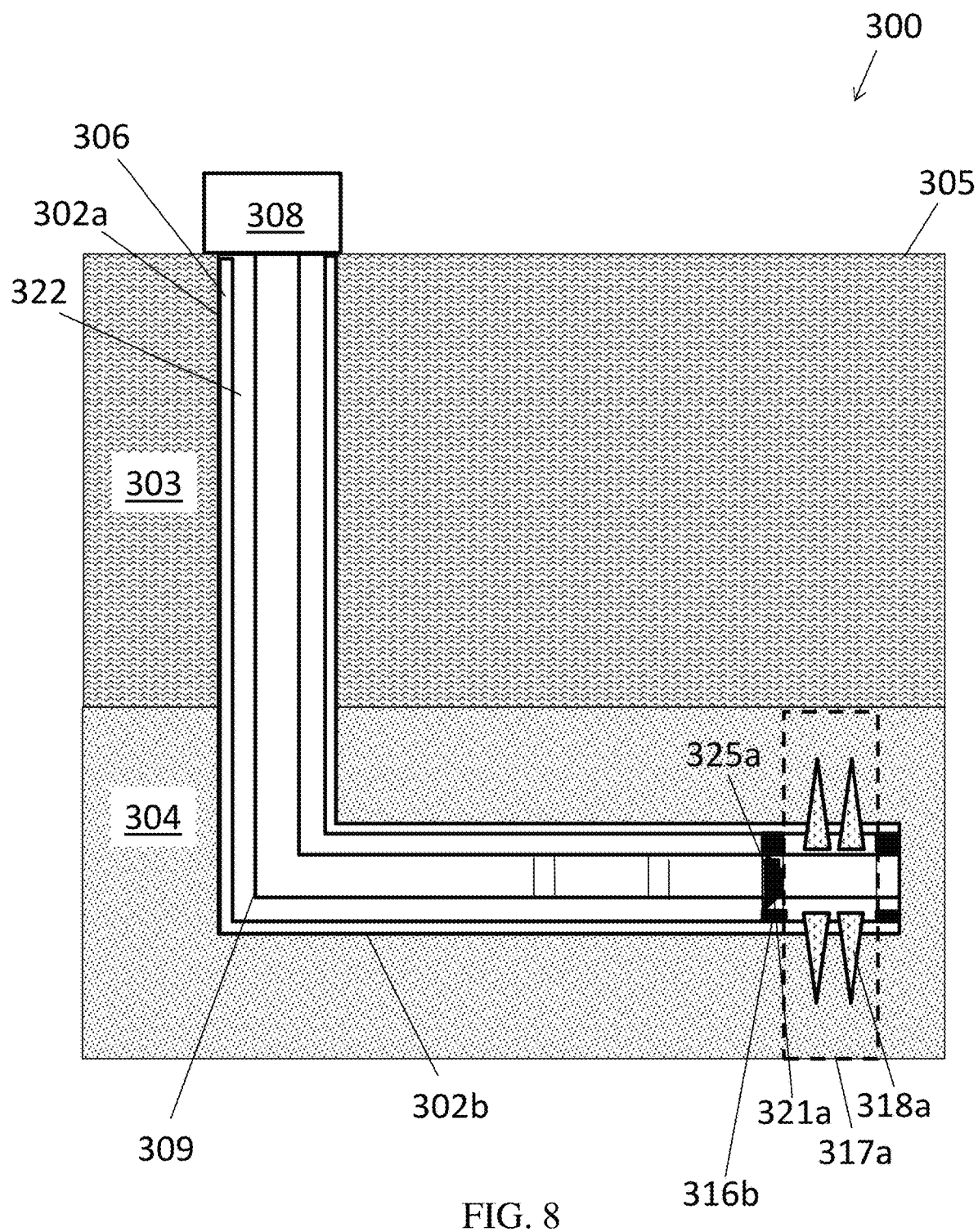

Now referring to FIG. 8, after a predetermined amount of injected CO2 is converted into the carbonate within the first target area 317a, the CO2 source 319 is disconnected. With the CO2 source 319 disconnected, a first plug 321a may be deployed to land within a first bore receptacle 325a in the second packer 316b and seal off flow to the first target area 317a. In some embodiments, the injection tubing string 309 may be removed from the wellbore 302a, 302b when the first target area 317a is sealed off.

Figure 9:
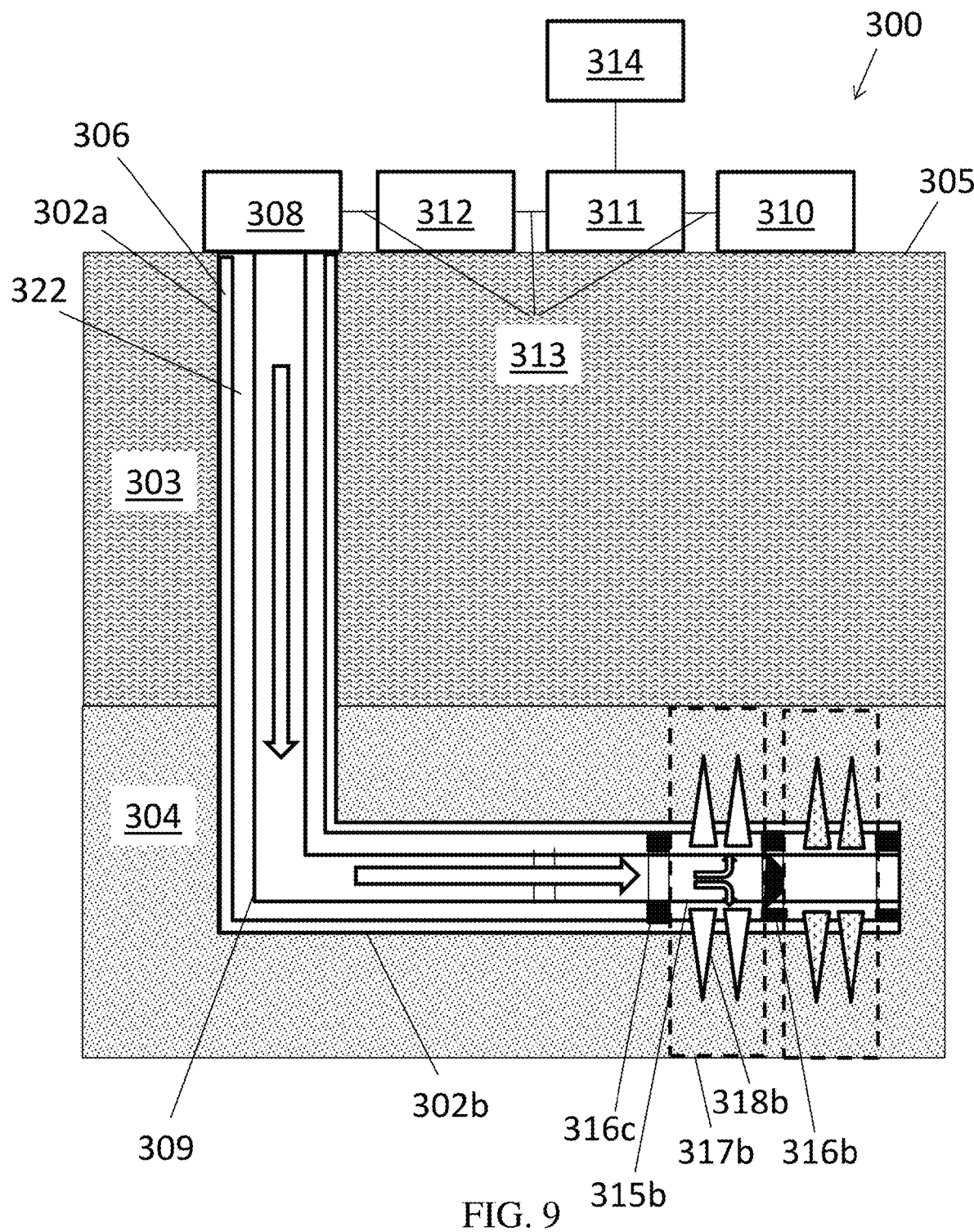

In one or more embodiments, if more CO2 storage is required, a second target area 317b in the second formation 304 may be used, as shown in FIG. 9. Additionally, the hydraulic fracturing equipment (310-313) and the carbonate reactive mineral ore source 314 that has been removed from the well site 300 is brought back to the well site 300. Additionally, the carbonate reactive mineral ore source 314 may be the same carbonate reactive mineral ore or different carbonate reactive mineral ore from the one used in the first target area 317a. With the second packer 316b below a second fracturing device 315b already actuated, a third packer 316c above the second fracturing device 315b is actuated to seal to an annulus between the casing 306 and the injection tubing string 309 to isolate the second target area 317b.

Still referring to FIG. 9, the carbonate reactive mineral ore mixture is pumped down (see unfilled block arrows) the wellbore 302a, 302b and into the second fracturing device 315b. From the second fracturing device 315b, the carbonate reactive mineral ore mixture is injected to perforate the casing 306, fracture the second target area 317b, and form fractures 318b within the second target area 317b. A volume of the carbonate reactive mineral ore mixture will fill the fractures 318b.

Figure 10:
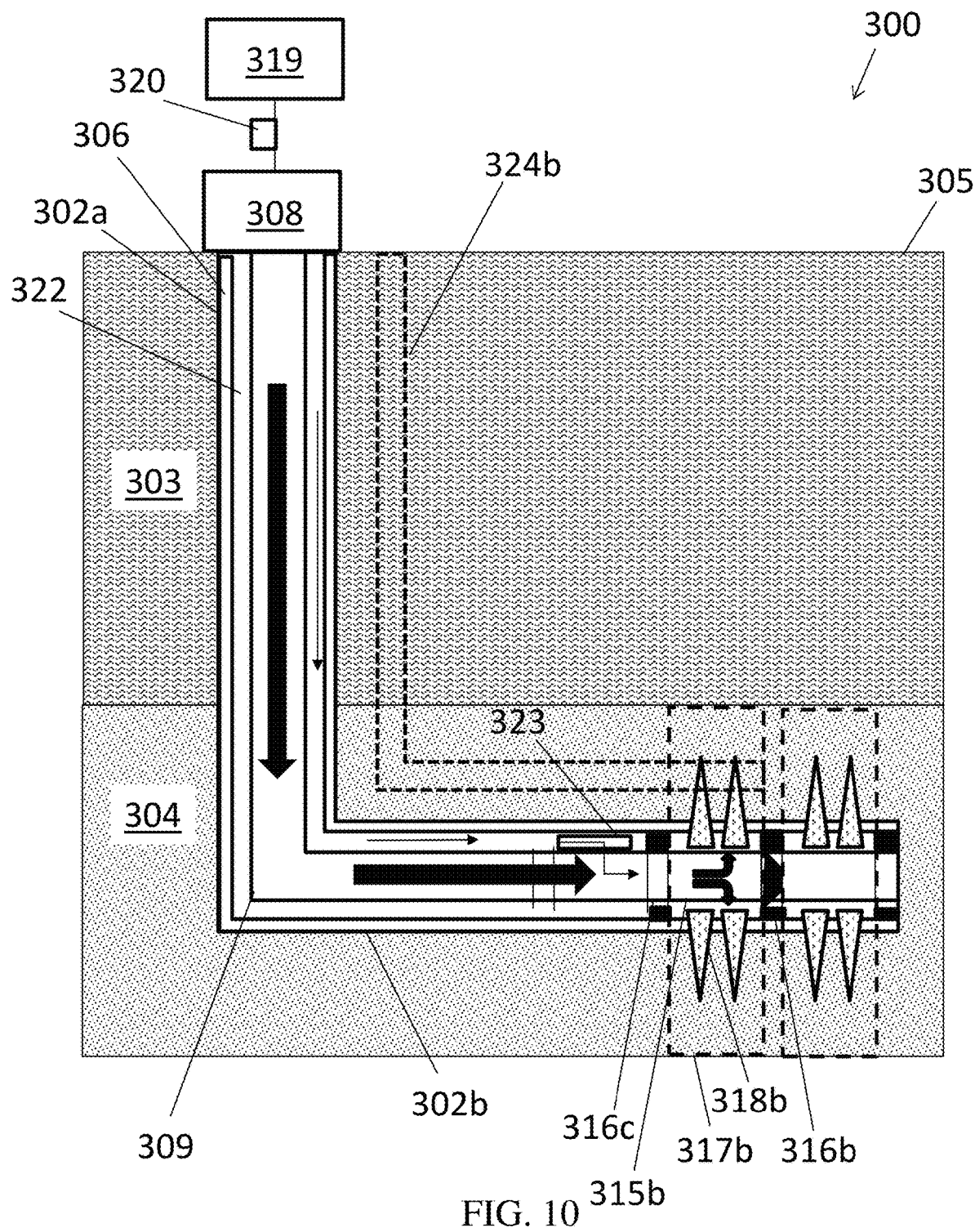

In one or more embodiments, with the fractures 318b filled with the volume of the carbonate reactive mineral ore mixture, a different or the same CO2 source 319 is fluidly coupled to the wellhead 308, as shown in FIG. 10. Additionally, the hydraulic fracturing equipment (310-313) may be removed from the well site 300 before the CO2 source 319 is fluidly coupled to the wellhead 308. Additionally, a compressor 320 between the CO2 source 319 and the wellhead 308 may compress the CO2 into a dense state for transport to the well. With the CO2 source 319 fluidly coupled to the wellhead 308, CO2 is injected down (see filled block arrows) the injection tubing string 309. The injected CO2 will exit the injection tubing string 309 through the second fracturing device 315b and enter the fractures 318b. In the fractures 318b, the injected CO2 will chemically react with the carbonate reactive mineral ore mixture filled in the fractures 318b. As the chemical reaction occurs, the injected CO2 is converted into a carbonate solid (e.g., Manganese Carbonate $MnCO_3$, Magnesium Carbonate ($MgCO_3$), or Calcium Carbonate ($CaCO_3$)) for storage within the second target area 317b.

Still referring to FIG. 10, in one or more embodiments, water may be needed to mix in to supplement the carbonate reaction of the injected CO2 and carbonate reactive mineral ore. When water is needed, water may be simultaneously injected into the wellbore 302a, 302b with the CO2. For example, water may be injected in the annulus 322 between the casing 306 and the injection tubing string 309. From the annulus 322, the water may enter the injection tubing string 309 via the side pocket mandrel 323. The side pocket mandrel 323 allows the water to be pumped though the annulus 322 (or through a separate line) to enter the wellbore 302a, 302b at a bottom of the injection tubing string 309 to mix with the injected CO2 as the injected CO2 enters the fractures 318b. By mixing the water at the bottom, carbonic acid corrosion is minimized to just the components at the point of injection instead of the wellhead 308 and the entire injection tubing string 309. However, in some embodiments, water may be injected in one or more adjacent wells 324b in communication with or having a region near the second target area 317b. It is further envisioned that the injected water may be refuse water, wastewater, fracturing water, mineral water, or other types of water.

Figure 11:
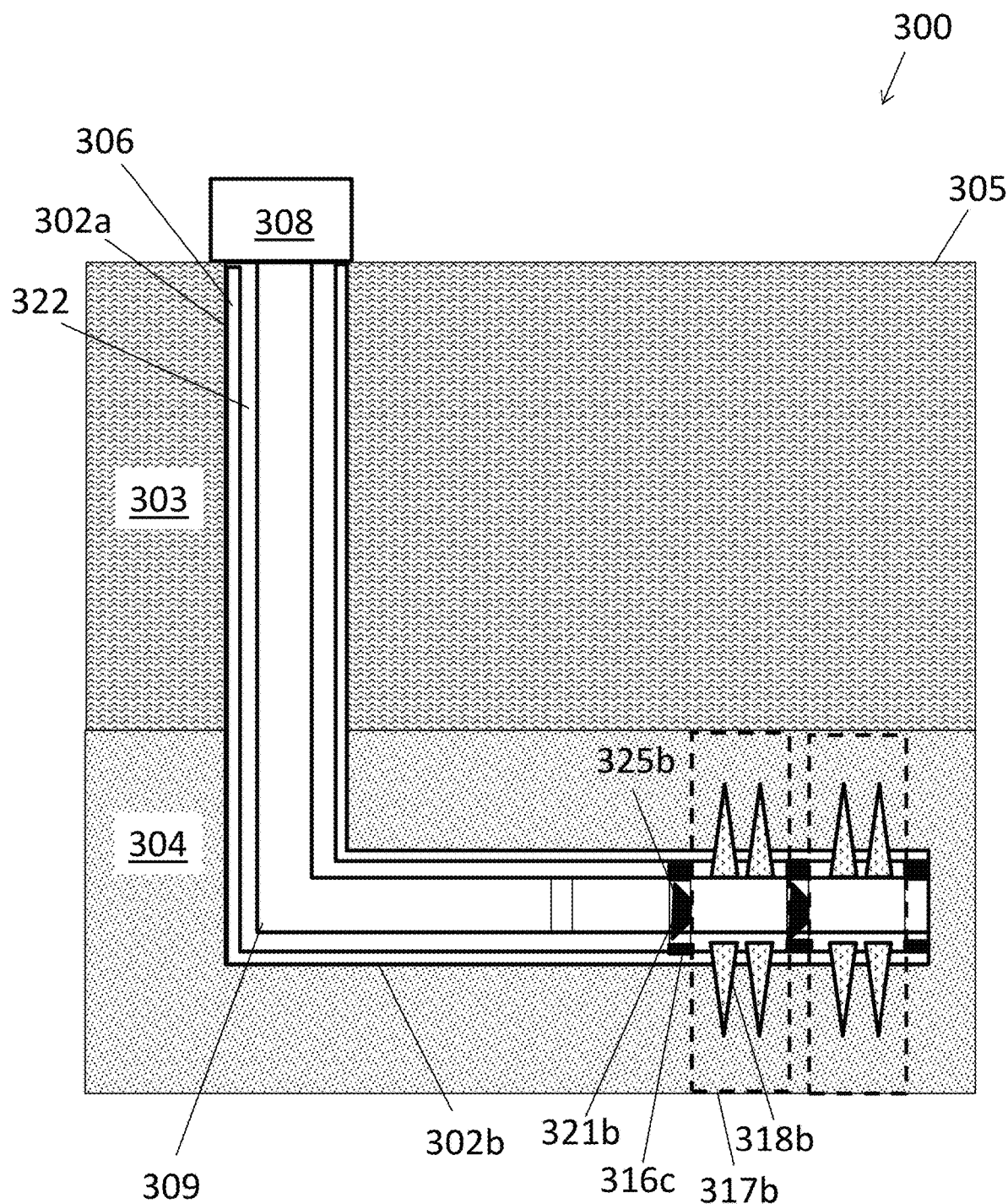

Now referring to FIG. 11, after a predetermined amount of injected CO2 is converted into the carbonate within the second target area 317b, the CO2 source 319 is disconnected. With the CO2 source 319 disconnected, a second plug 321b may be deployed to land within a second bore receptacle 325b in the third packer 316c and seal off flow to the second target area 317b. In some embodiments, the injection tubing string 309 may be removed from the wellbore 302a, 302b when the second target area 317b is sealed off.

Figure 12:
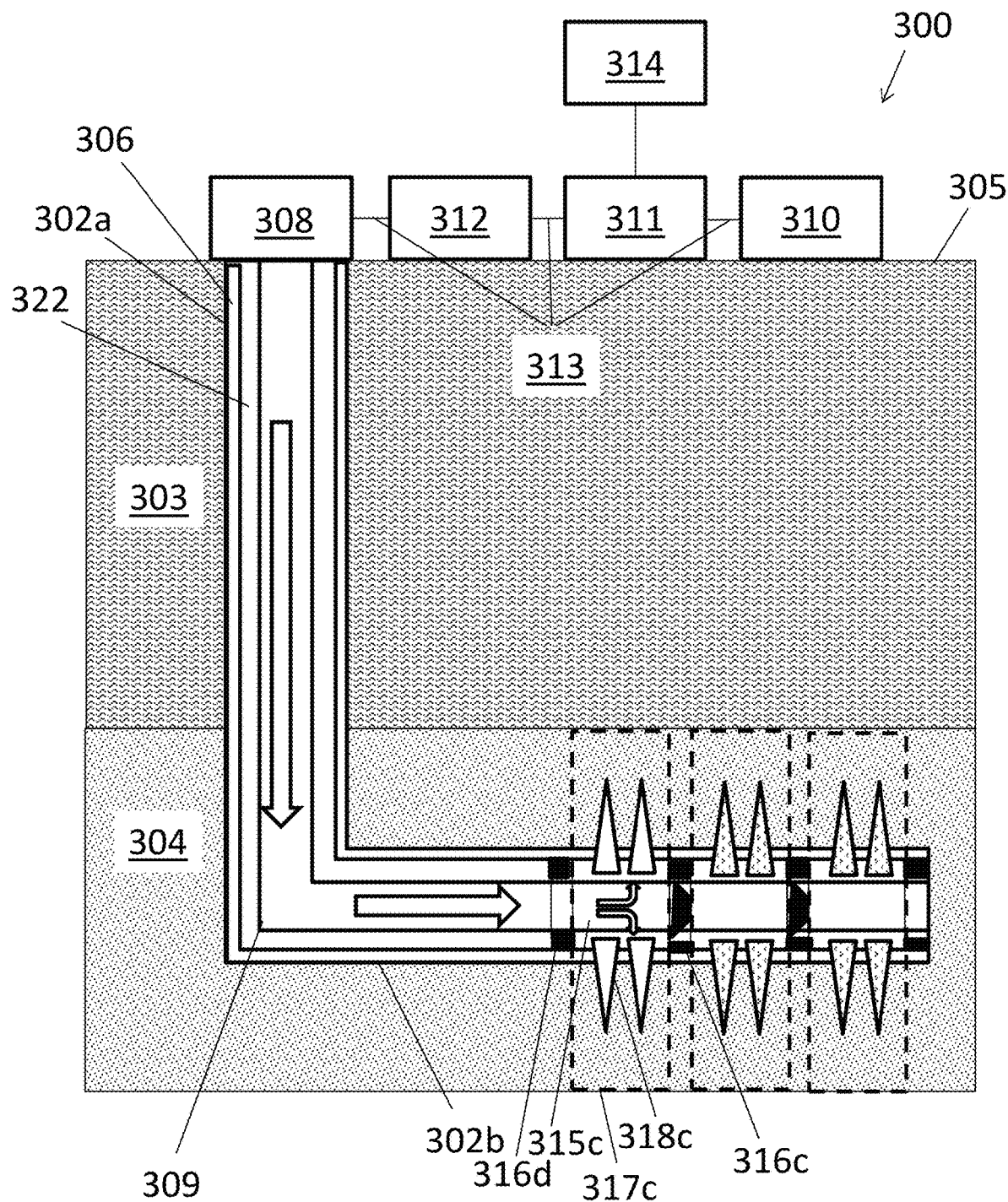

In one or more embodiments, if even more CO2 storage is required, a third target area 317c in the second formation 304 may be used, as shown in FIG. 12. Additionally, the hydraulic fracturing equipment (310-313) and the carbonate reactive mineral ore source 314 that has been removed from the well site 300 is brought back to the well site 300. Additionally, the carbonate reactive mineral ore source 314 may be the same carbonate reactive mineral ore or different carbonate reactive mineral ore from the one used in the first target area 317a and/or the second target area 317b. With the third packer 316c below a third fracturing device 315c already actuated, a fourth packer 316d above the third fracturing device 315c is actuated to seal to an annulus between the casing 306 and the injection tubing string 309 to isolate the third target area 317c.

Still referring to FIG. 12, the carbonate reactive mineral ore mixture is pumped down (see unfilled block arrows) the wellbore 302a, 302b and into the third fracturing device 315c. From the third fracturing device 315c, the mixture of water and carbonate reactive mineral is injected to perforate the casing 306, fracture the third target area 317c, and form fractures 318c within the third target area 317c. A volume of the carbonate reactive mineral ore mixture will fill the fractures 318c.

Figure 13:
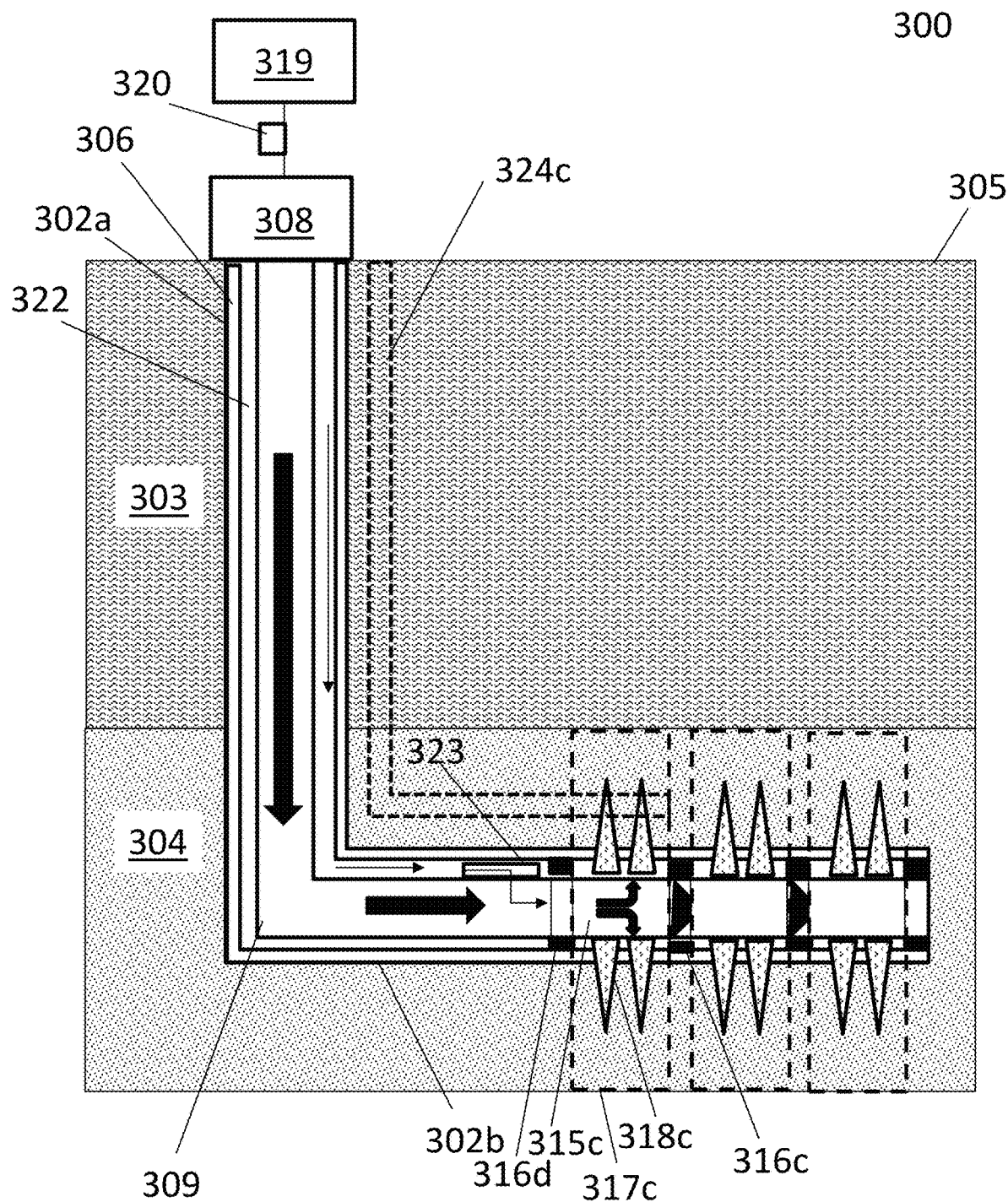

In one or more embodiments, with the fractures 318c filled with the volume of the mixture of water and carbonate reactive mineral ore, a different or the same CO2 source 319 is fluidly coupled to the wellhead 308, as shown in FIG. 13. Additionally, the hydraulic fracturing equipment (310-313) may be removed from the well site 300 before the CO2 source 319 is fluidly coupled to the wellhead 308. Additionally, a compressor 320 between the CO2 source 319 and the wellhead 308 may compress the CO2 into a dense state for transport to the well. With the CO2 source 319 fluidly coupled to the wellhead 308, CO2 is injected down (see filled block arrows) the injection tubing string 309. The injected CO2 will exit the injection tubing string 309 through the third fracturing device 315c and enter the fractures 318c. In the fractures 318c, the injected CO2 will chemically react with the volume of the mixture of water and carbonate reactive mineral ore filled in the fractures 318c. As the chemical reaction occurs, the injected CO2 is converted into a carbonate solid (e.g., Manganese Carbonate MnCO3, Magnesium Carbonate (MgCO3), or Calcium Carbonate (CaCO3)) for storage within the third target area 317c.

Still referring to FIG. 13, in one or more embodiments, water may be needed to mix in to supplement the carbonate reaction of the injected CO2 and carbonate reactive mineral ore. When water is needed, water may be simultaneously injected into the wellbore 302a, 302b with the CO2. For example, water may be injected in the annulus 322 between the casing 306 and the injection tubing string 309. From the annulus 322, the water may enter the injection tubing string 309 the side pocket mandrel 323. The side pocket mandrel 323 allows the water to be pumped though the annual 322 (or through a separate line) to enter the wellbore 302a, 302b at a bottom of the injection tubing string 309 to mix with the injected CO2 as the injected CO2 enters the fractures 318c. by mixing the water at the bottom, carbonic acid corrosion is minimized to just the components at the bottom instead of the entire wellhead 308 and the injection tubing string 309. However, in some embodiments, water may be injected in one or more adjacent wells 324c in communication with or having a region near the third target area 317c. It is further envisioned that the injected water may be refuse water, wastewater, fracturing water, mineral water, or other types of water.

Figure 14:
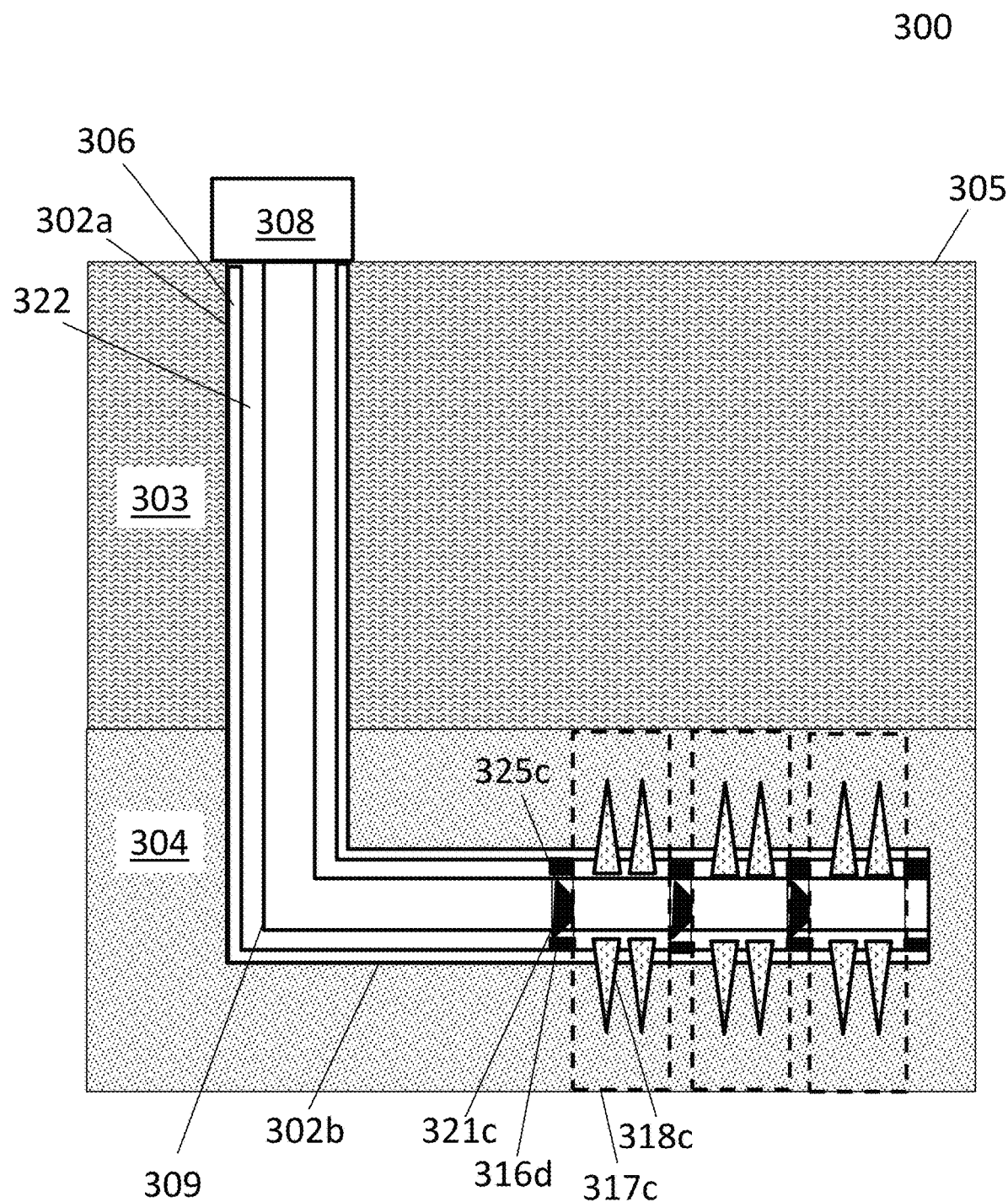

Now referring to FIG. 14, after a predetermined amount of injected CO2 is converted into the carbonate within the third target area 317c, the CO2 source 319 is disconnected. With the CO2 source 319 disconnected, a third plug 321c may be deployed to land within a third bore receptacle 325c in the fourth packer 316d and seal off flow to the third target area 317c. In some embodiments, the injection tubing string 309 may be removed from the wellbore 302a, 302b when the third target area 317c is sealed off. Optionally, additional subsequent zones (e.g., a fourth target area, fifth target area, etc.) may be recompleted in the same or similar manner as described with reference to FIGS. 3-14.

In addition to the benefits described, the Carbon Capture and Sequestration (CCS) methods and systems disclosed herein may improve an overall efficiency and performance of carbon dioxide (CO2) storage operations in a subterranean formation while increasing the storage duration. Additionally, the CCS methods and systems disclosed herein may reduce the risk of CO2 leaking out of the subterranean formation as the CO2 is converted into a carbonate. Further, the CCS methods and systems disclosed herein may provide further advantages such as decreasing emissions of CO2 into the atmosphere.

While the method and apparatus have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method, comprising:
hydraulic fracturing a first target area in a subterranean formation with a fracturing fluid containing a reactant proppant to form fractures in the first target area,
wherein pressure from the hydraulic fracturing injects and traps the reactant proppant into the fractures, and
wherein the reactant proppant comprises crushed reactive mineral ore;
in a subsequent injection step, injecting a volume of carbon dioxide into the fractures in the first target area;
reacting the volume of carbon dioxide with the crushed reactive mineral ore to chemically convert the volume of carbon dioxide into a carbonate;

storing the carbonate in the fractures in the first target area;
removing injection tubing that was used to inject the volume of carbon dioxide in the first target area; and
setting an isolation plug in an isolation packer to permanently and physically isolate the first target area from subsequent target areas planned for the subterranean formation;
wherein the hydraulic fracturing comprises injecting the fracturing fluid into a previously abandoned well, a disposal well, or a non-potable aquifer.

2. The method of claim 1, further comprising mixing the crushed reactive mineral ore with a delivery fluid at a surface above the subterranean formation to create a transport slurry and form the fracturing fluid.

3. The method of claim 2, further comprising selecting the crushed reactive mineral ore from a laden basalt containing at least one or more reactive elemental metal laden Manganese, Magnesium, or Calcium.

4. The method of claim 3, wherein, based on the selected crushed reactive mineral ore, the carbonate is Manganese Carbonate, Magnesium Carbonate, or Calcium Carbonate.

5. The method of claim 1, further comprising:
hydraulic fracturing a second target area in the subterranean formation with a second volume of the fracturing fluid to form fractures in the second target area and to inject the reactant proppant into the fractures;
in a subsequent injection step, injecting a second volume of carbon dioxide and water into the fractures in the second target area;
reacting the second volume of carbon dioxide with the reactant proppant in the fractures to chemically convert the second volume of carbon dioxide into a second carbonate;
storing the second carbonate in the fractures in the second target area.

6. The method of claim 1, further comprising:
monitoring an amount of the carbon dioxide that chemically reacts with the reactant proppant.

7. A method, comprising:
choosing a well site for Carbon Capture and Sequestration;
preparing a well at the well site for Carbon Capture and Sequestration, comprising removing a plug plugging an opening of the well;
hydraulic fracturing a target area of a formation using a fracturing fluid containing a reactant proppant to form fractures in the target area and to inject the reactant proppant in the fractures,
wherein the target area is in communication with a perforated zone in a well in the well site, and
wherein the reactant proppant comprises an amount of a carbonate reactive mineral ore;
injecting a volume of carbon dioxide into the fractures in the target area in a subsequent injection step, wherein the volume of carbon dioxide is selected based on the amount of carbonate reactive mineral ore;
reacting the volume of carbon dioxide with the reactant proppant to chemically convert the volume of carbon dioxide into a carbonate;
isolating the perforated zone using an isolation plug after injecting the volume of carbon dioxide; and
storing the carbonate in the fractures in the target area to form a first Carbon Capture and Sequestration (CCS) treated area.

8. The method of claim 7, wherein preparing the well site for Carbon Capture and Sequestration further comprises:
removing surface and downhole equipment in the well;
setting an isolation packer and a bore receptacle to physically isolate the perforated zone in the well from the rest of the well;
fluidly coupling a wellhead to the well at the surface;
extending a tubular string into the well to reach the target area; and
connecting the tubular string to the isolation packer and the bore receptacle to fluidly couple the target area to the wellhead at the surface.

9. The method of claim 8, further comprising preparing the well site for a second Carbon Capture and Sequestration after forming the first CCS treated area, comprising:
removing injection tubing in the well that was used to form the first CCS treated area; and
setting the isolation plug in the isolation packer and the bore receptacle to permanently and physically isolate the first CCS treated area in the well from subsequent target areas planned for the well.

10. The method of claim 8, further comprising:
accessing the target area with two separate and adjacent wells comprising the well and a second well,
wherein the volume of carbon dioxide is injected through the first well into the target area,
wherein a volume of water is injected through the second well into the target area, and
wherein the injected carbon dioxide and water mix with the reactant proppant in the fractures.

11. The method of claim 8, further comprising:
separately transporting the volume of carbon dioxide and a volume of water from the wellhead via separate conduits to a region near the target area;
mixing the injected carbon dioxide and water in the region near the target area; and
hydraulically injecting the mixture into the fractures to subsequently react with the reactant proppant trapped in the fractures.

12. The method of claim 7, further comprising selecting the carbonate reactive mineral ore from at least one or more of crushed laded basalt ores containing one or more reactive elemental metals selected from Manganese, Magnesium, or Calcium.

13. The method of claim 12, wherein, based on the selected carbonate reactive mineral ore, the carbonate is Manganese Carbonate, Magnesium Carbonate, or Calcium Carbonate.

14. The method of claim 7, wherein choosing the well site for Carbon Capture and Sequestration further comprises removing downhole equipment within the well site and replacing with corrosion resistant equipment.

15. A system, comprising:
a wellbore extending a depth from a surface to a target formation;
fractures in the target formation formed by a fracturing fluid containing a reactant proppant, wherein the reactant proppant comprises crushed reactive mineral ore, and wherein the reactant proppant is trapped in the fractures; and
a volume of carbon dioxide injected down the wellbore and into the fractures in at least one target area of the target formation,
wherein the volume of carbon dioxide is chemically reacted with the crushed reactive mineral ore to be stored as a non-gaseous carbonate in the fractures of the at least one target area,
wherein the wellbore contains at least one plug sealing off each of the at least one target area, and wherein the crushed carbonate reactive mineral ore has an average particle size ranging from 8 mesh (106 μm) to 140 mesh (2.36 mm).

16. The system of claim 15, wherein the crushed reactive mineral ore is selected from at least one of Manganese, Magnesium, or Calcium laden basalt.

17. The system of claim 16, wherein, based on the selected crushed reactive mineral ore, the formed non-gaseous carbonate is Manganese Carbonate (MnCO3), Magnesium Carbonate (MgCO3), or Calcium Carbonate (CaCO3).

* * * * *